United States Patent
Blomstergren et al.

(10) Patent No.: US 8,693,329 B2
(45) Date of Patent: Apr. 8, 2014

(54) CONGESTION CONTROL IN A WIRELESS COMMUNICATION NETWORK

(75) Inventors: Lars Blomstergren, Kullavik (SE); Peter Lundh, Skärholmen (SE); Szilveszter Nádas, Budapest (HU); Zoltán Nagy, Szeged (HU)

(73) Assignee: Unwired Planet, LLC, Reno, NV (US)

( * ) Notice: Subject to any disclaimer, the term of this patent is extended or adjusted under 35 U.S.C. 154(b) by 175 days.

(21) Appl. No.: 13/000,996

(22) PCT Filed: Jun. 24, 2008

(86) PCT No.: PCT/SE2008/050762
§ 371 (c)(1),
(2), (4) Date: Mar. 18, 2011

(87) PCT Pub. No.: WO2009/157826
PCT Pub. Date: Dec. 30, 2009

(65) Prior Publication Data
US 2011/0164500 A1    Jul. 7, 2011

(51) Int. Cl.
H04L 12/26    (2006.01)
G06F 15/16    (2006.01)

(52) U.S. Cl.
USPC .......................................... 370/231; 709/235

(58) Field of Classification Search
None
See application file for complete search history.

(56) References Cited

U.S. PATENT DOCUMENTS

| | | | | |
|---|---|---|---|---|
| 7,263,067 B2* | 8/2007 | Sreemanthula et al. | ...... | 370/236 |
| 7,336,608 B2* | 2/2008 | Sin et al. | ...... | 370/232 |
| 7,463,583 B2* | 12/2008 | Hamdi | ...... | 370/231 |
| 7,580,716 B2* | 8/2009 | Ransom et al. | ...... | 455/453 |
| 7,623,459 B2* | 11/2009 | Yang et al. | ...... | 370/235 |
| 7,650,379 B2* | 1/2010 | Hart et al. | ...... | 709/203 |
| 7,693,052 B2* | 4/2010 | Jin et al. | ...... | 370/230 |
| 7,724,656 B2* | 5/2010 | Sagfors et al. | ...... | 370/229 |
| 7,760,638 B2* | 7/2010 | Shimonishi et al. | ...... | 370/235 |
| 7,778,164 B2* | 8/2010 | Shimonishi | ...... | 370/229 |
| 7,821,939 B2* | 10/2010 | DeCusatis et al. | ...... | 370/232 |

(Continued)

FOREIGN PATENT DOCUMENTS

| EP | 1 879 339 A2 | 6/2002 |
|---|---|---|
| EP | 1 768 341 A1 | 9/2006 |
| EP | 1 906 602 A1 | 4/2008 |
| WO | WO 2008/066428 A1 | 6/2008 |

OTHER PUBLICATIONS

Forouzan et al. "TCP/IP Protocol Suite" McGraw-Hill, 3rd Edition, pp. 316-320, 2006.

(Continued)

*Primary Examiner* — Gregory Sefcheck
(74) *Attorney, Agent, or Firm* — Nixon & Vanderhye P.C.

(57) ABSTRACT

The present invention is related to a method, base station (RBS) and computer program for quickly recovering from a detected congestion over the air interface. First the current bitrate at the which the air interface congestion has been detected is stored as a new reference bitrate. Thereafter, the base station (RBS) requests a reduction of the bitrate associated with the air interface. When the congestion condition has subsided the base station (RBS) requests a boost of the bitrate associated with the air interface up to the stored new reference bitrate. When finally the new reference bitrate has been reached, the base station (RBS) requests a linear increase of the bitrate associated with the air interface.

12 Claims, 5 Drawing Sheets

(56) References Cited

U.S. PATENT DOCUMENTS

| | | | |
|---|---|---|---|
| 7,899,011 B2* | 3/2011 | Petrovic et al. | 370/329 |
| 7,974,195 B2* | 7/2011 | Jin et al. | 370/231 |
| 8,000,242 B2* | 8/2011 | Wang et al. | 370/235 |
| 2003/0112275 A1 | 6/2003 | Proulx et al. | |
| 2003/0139145 A1* | 7/2003 | Lee et al. | 455/69 |
| 2003/0152096 A1* | 8/2003 | Chapman | 370/412 |
| 2004/0071086 A1* | 4/2004 | Haumont et al. | 370/230 |
| 2004/0179525 A1* | 9/2004 | Balasubramanian et al. | 370/391 |
| 2006/0159016 A1* | 7/2006 | Sagfors et al. | 370/230 |
| 2007/0043558 A1* | 2/2007 | Schwarz et al. | 704/207 |
| 2008/0212575 A1* | 9/2008 | Westberg | 370/356 |
| 2011/0029664 A1* | 2/2011 | Harrang et al. | 709/224 |

OTHER PUBLICATIONS

Weerawardane et al. "Preventive and Reactive based TNL Congestion Control Impact on the HSDPA Performance" Vehicular Technology Conference 2008, Piscataway, New Jersey, May 11, 2008, pp. 2296-2300.

International Search Report corresponding to PCT Application No. PCT/SE2008/050762, Date of Mailing: Jan. 28, 2009.

Written Opinion of the International Searching Authority corresponding to PCT Application No. PCT/SE2008/050762, Date of Mailing: Jan. 28, 2009.

ETSI TS 125 435 v7.8.0 (Apr. 2008); UTRAN Lub Interface User Plane Protocols for Common Transport Channel Data Streams (3GPP TS 25.435 v7.8.0 Release 7).

\* cited by examiner

CONGESTION CONTROL IN A WIRELESS COMMUNICATION NETWORK

CROSS REFERENCE TO RELATED APPLICATION

This application is a 35 U.S.C. §371 national stage application of PCT International Application No. PCT/SE2008/050762, filed on 24 Jun. 2008, the disclosure and content of which is incorporated by reference herein in its entirety. The above-referenced PCT International Application was published in the English language as International Publication No. WO 2009/157826 A1 on 30 Dec. 2009.

TECHNICAL FIELD

The present invention is related to congestion control in a wireless communication network. More specifically, it is related to actions taken after congestion conditions are detected over one or more interfaces between nodes in a wireless communication network.

BACKGROUND OF THE INVENTION

In wireless communication networks of the third generation of which the UMTS (Universal Mobile Telephony System) is an example, user traffic is forwarded from a GGSN (Gateway GPRS Support Node) and a SGSN (Serving GPRS Support Node) via the RNC (Radio Network Controller) to one or more BSs (Base Stations) and finally to one or more UEs (User Equipments). User traffic may also be transmitted via an external PDN (Packet Data Network) via the previous nodes to the UE.

In the remaining part of the description, BSs, which in wireless networks of the third generations comprise Node B's, will simply be referred to as RBSs (Radio Base Stations).

In UMTS networks the role of the GGSN and SGSN is more of a data packet router, while the RNC is controlling the use of radio resources in the wireless communication network.

Here, the Iub interface is the communication interface over which the user data is exchanged between the RNC and the RBS. User data transmission and reception between an RBS and a UE (User Equipment), however, is handled over the Uu interface which is the air interface between the RBS and the UE.

These interfaces are illustrated in FIG. 1.

Data transmission between an RNC (or SRNC) and a Radio Base Station (RBS) and between an RBS and one or more UEs (User Equipments) usually proceeds by transmitting one or more PDUs (Packet Data Units) from a PDU buffer (PDU Bf) in the RNC to a PDU buffer in the RBS and further from a PDU buffer in the RBS to a UE In an HSDPA scenario, packet buffers in a base station transceiver are called PQs (Priority Queues). One illustration of this is given in FIG. 2

Now, specifically in WCDMA RAN HSDPA (Wideband Code Division Multiple Access Radio Access Network High-Speed Downlink Packet Access) wireless communication networks, part of the user plane traffic over the Iub interface is regulated by a flow control algorithm at the Framing Protocol level. Using flow control, an RBS can, depending on bitrate capacity over the air interface Uu and possible congestion over the Iub interface, instruct the RNC to vary the data rate delivered to the RBS and belonging to a certain data flow. This the RBS does by transmitting CA (Capacity Allocation) control frames defining the maximum available data rate for data transmission from the RNC to the RBS via the Iub interface.

In this fashion, more PDUs per time unit (or higher data rates) can be made available to those data flows which show good connection quality leading to higher packet data rates experienced at the specific UE.

Hence the main goal for the flow control is to ensure that the RNC provides the RBS with the correct amount of data packets in PQs. A low amount of data from the RNC may lead to PQs in the RBS becoming empty and the air interface capacity not utilized fully. On the other hand, a high amount of data from the RNC may cause the HSDPA scheduler not be able to schedule data in time so that data becomes too old in the. Also, if PQs are allowed to grow too much, retransmission from PDU buffers in the RNC would take longer.

From a flow control point of view there are two types of bottleneck for the HS (High-Speed) data flow in a HSDPA-based wireless communication network, namely the Iub and Uu interfaces. Iub interfaces normally have an essentially fixed maximum available bandwidth or maximum available bitrate capacity which under normal circumstances does not vary. When the bottleneck is reached, e.g. when the transmitted bitrate is higher than the bottleneck bitrate) the RBS starts receiving incorrect or delayed data frames from the RNC.

In contrast to the Iub interface, the maximum available bandwidth over the Uu interface can vary drastically. The most significant source of the drastic bandwidth changes over the Uu interface consists of changing air-interface conditions and the fast channel dependent modulation and coding to account for these changing conditions.

These two types of bottlenecks, i.e. Iub congestions and Uu congestions, should be treated in different ways. In HSDPA-networks, fairness on the Iub interface is handled by HSDPA flow control and by a HSDPA scheduler for the Uu interface. As a consequence, it is important for the CA bitrate (data rate requested from an RBS to the RNC) to follow air-interface performance variations in a good and fast way. Present solutions have the drawback that Uu congestions are treated in an Iub congestion detection fashion, i.e. using the linear data rate increase also after a Uu congestion detection, which is not optimal.

In solutions known from existing technology, it is possible to increase the CA bitrate with a boosting factor when no Iub congestion occurs. The increase rate is then higher than the linear increase rate which is used after an Iub congestion. Boosting is used if the amount of data in the PQs becomes too low. This ensures that PQs will be filled with data rapidly if the air-interface performance is improved so that higher data rate can be used to the UE.

However, in solutions used in known technology, when an Iub congestion occurs, the intention is that only linear increase shall be allowed for a while so that the Iub bottleneck isn't exceeded again too quickly. Therefore a timer is set to prevent the faster increase with a boosting factor mentioned above (when PQs gets empty).

The drawback with this solution is for fast fluctuating air-interface conditions when the CQI changes rapidly and after an Iub congestion has been detected. Usually, (when no Iub congestions have been detected) a decrease in CA bitrate due to Uu congestion can be followed by an increase with the boosting factor if the air-interface conditions change quickly. This is not allowed after an Iub congestion so that PQs run empty and the air-interface capacity is not fully used.

The present invention aims at solving at least some of the disadvantages related to known technology.

SUMMARY One aspect of the present invention is related to a method for congestion control in a wireless communication network comprising an air interface, the method comprising the steps:

detecting a congestion condition over the air interface;
storing a current bitrate at which the congestion condition over the air interface was detected as a new reference bitrate;
requesting a reduction of the current bitrate;
requesting a boost of the bitrate associated with the air interface up to the stored new reference bitrate and;
requesting a gradual increase of the bitrate associated with the air interface beyond the stored reference bitrate.

By means of the method according to the present invention a system using the method of the present invention may recover more quickly from air interface congestions than systems using methods according to known technology. As a consequence, the method according to the present invention allows efficient utilization of the air interface bottleneck while keeping fairness and stability over the transport network interface bottleneck. This is especially important when both the air interface and the transport network interface are potential bottlenecks, and this is judged to be a common case e.g. when the air-interface conditions fluctuate.

Another aspect of the present invention is related to a base station for communication in a wireless communication network comprising:
   a receiver/transmitter combination for transmitting and receiving packet data;
   a buffer unit for storing packet data before transmission;
   a measurement unit for determining the status of the packet data in the buffer unit;
   a control unit for transmitting requests for adjustments of the bitrate over a transport network interface
   a processing unit for comparing the determined status of the buffer unit with a predetermined status value; where the processing unit is adapted for storing a current bitrate value as a new reference bitrate value when detecting a congestion condition over the air interface, the processing unit being further adapted for instructing the control unit to send control information over the transport network interface indicative of a request for bitrate boosting over the transport network interface up to the stored new reference bitrate value.

Yet another aspect of the present invention is related to a base station for communication in a wireless communication network comprising:
   a receiver/transmitter combination for transmitting and receiving packet data;
   a buffer unit for storing packet data before transmission;
   a measurement unit for determining the status of the packet data in the buffer unit;
   a processing unit for comparing the determined status of the buffer unit with a predetermined status value;
   a control unit for transmitting requests for adjustments of the bitrate over a transport network interface; where the base station further comprises means for storing a current granted bitrate value as a new reference bitrate value when detecting a congestion condition over the air interface and for instructing the control unit to send control information over the transport network interface indicative of a request for bitrate boosting over the transport network interface up to the stored new reference bitrate value.

Finally, another aspect of the present invention is related to a computer program for congestion control in a wireless communication network comprising an air interface, comprising instruction sets for:
   detecting a congestion condition over the air interface;
   storing a current bitrate at which the congestion condition over the air interface was detected as a new reference bitrate;
   requesting a reduction of the current bitrate;
   requesting a boost of the bitrate associated with the air interface up to the stored new reference bitrate and;
   requesting a gradual increase of the bitrate associated with the air interface beyond the stored reference bitrate.

DETAILED DESCRIPTION

Figure 1:
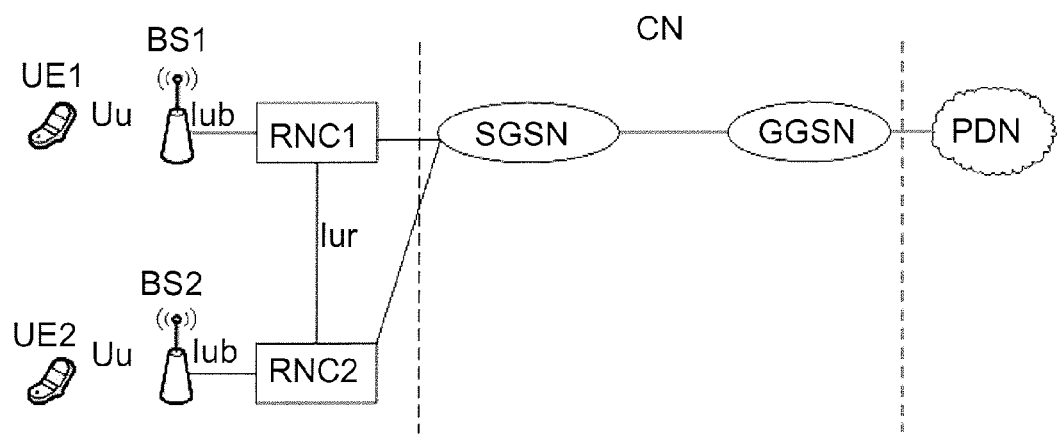
FIG. 1 illustrates a wireless network infrastructure according to known technology
Figure 2:
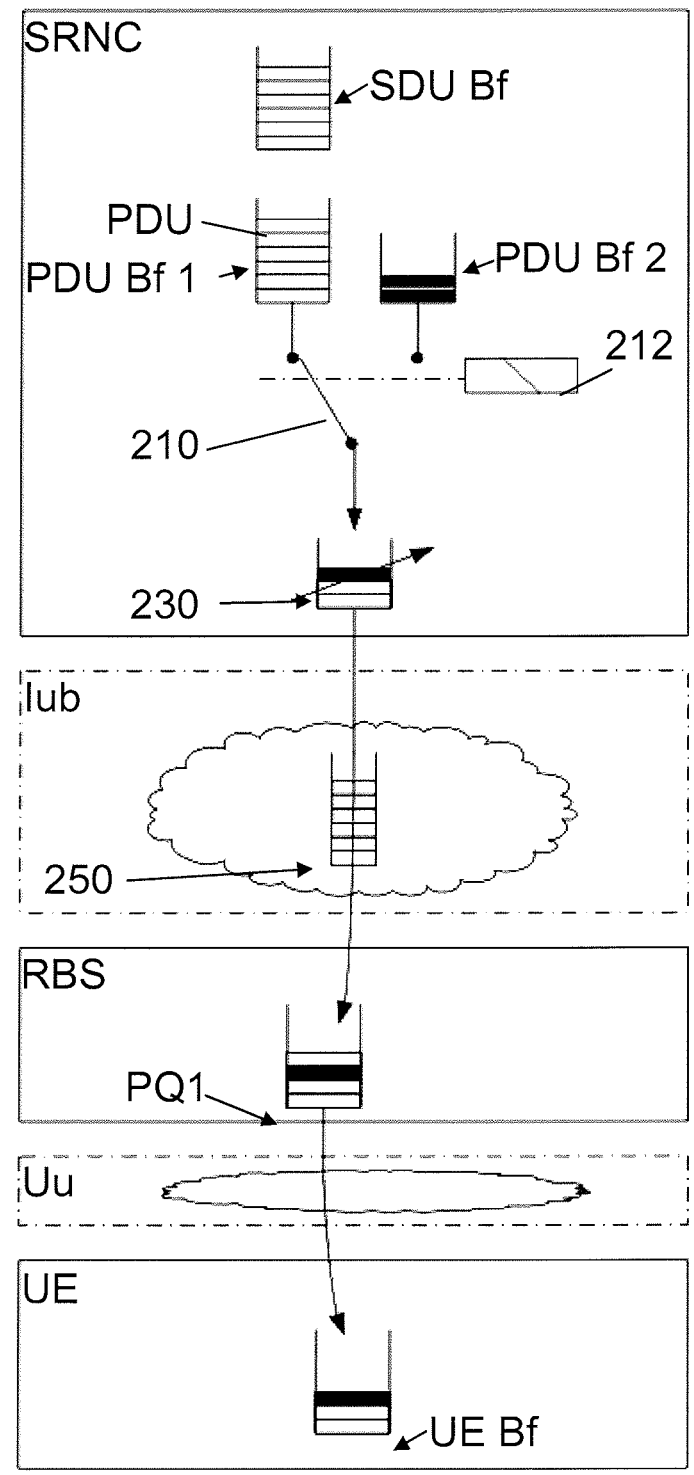
FIG. 2 illustrates schematically priority queue management in a network infrastructure according to known technology.

FIG. 2 illustrates flow control according to known technology showing the nodes and terminals from FIG. 1 in more detail.

Here, a SRNC (Serving Radio Network Controller) is adapted for using HS (High-Speed) flow control in order to shape a HS bitrate towards a base station (RBS).

The SRNC, like the RBS and the UE is equipped with buffers. Using buffers, data traffic flows may be regulated more efficiently. The SRNC being a unit operating on the link level, comprises an SDU Buffer (SDU Bf) containing, SDUs (Service Data Units) which on a lower level are transformed into packet data or PDUs (Packet Data Units) as illustrated by the white rectangles in FIG. 2.

Now in FIG. 2, two different PDU buffers are illustrated, PDU Bf 1 and PDU Bf 2, where the first buffer PDU Bf 1 carries PDUs transmitted for the first time shown as white rectangles, while the second buffer PDU Bf 2 contains PDUs which are going to be retransmitted shown as black rectangles.

Using a first switching unit 210 and a first control unit 212 the SRNC is adapted for switching between these two types of PDUs and giving priority to one type of PDUs over the other. Usually, retransmitted PDUs have a higher priority than first time transmitted PDUs.

Also, the SRNC in FIG. 2 comprises a second switching unit 220 and a second control unit 222 by means of which the SRNC can decide to switch between forwarding PDUs to a source cell buffer 230 or a target cell buffer 240. The switching time is regulated by the second control unit 222. Usually, the switching to a target cell is performed before the AT (Activation Time), i.e. the time when an UE starts receiving data in the target cell.

Using HS flow control mentioned earlier, the bitrate of a data flow can be controlled by receiving CA control frames from an RBS via the Iub interface or the TN (Transport Network) as shown in the figure.

In the case of congestion over the Iub interface due to, for example, buffer build-ups in the transport network, such as illustrated by the full source and target cell buffers 250 and 255, PDUs may be spending too much time in the buffers instead of being transmitted to the priority queues in the RBS. One possible consequence of this may be too old data in the buffers leading to either dropping of the old PDUs from the buffer or drastical reduction of the bitrate over the Iub interface.

Now, the RBS communicates with the RNC (in FIG. 2 it is the SRNC) via the Iub interface and with one or more UEs via the Uu or air interface. It should be mentioned here that one data flow is passed along by the RNC and the RBS is directed to one UE. However, there may be many such data flows, each being directed to one specific UE. For the sake of simplicity we will assume in the ensuing description that only one UE is present in the cell serviced by one RBS.

The use of priority queues in the RBS (such as PQ1 in FIG. 2), allows to utilize the varying air interface capacity. As known to the skilled person, these variations are caused by among others fading due to reflections of radio signals from different obstacles especially when UEs move quickly, interference between UEs in the same cell, interference from UEs in other cells and other factors.

As already mentioned earlier, the filling status of the priority queues should be just right, i.e. not too empty nor too full. Especially, congestions over the RNC-to-RBS interface (Iub) and over the air interface (Uu) may be detected by the base station. One way of detecting congestion over the Uu interface is to monitor a parameter indicative of the length of time a PDU spends in the priority queue and comparing that time with a predefined queue time.

Defining the queue time in terms of time intervals may then give information on whether PDUs are staying too long or too short in the priority queue.

In case one or more priority queues are detected to be congested, the RBS may then send CA control frames to the SRNC via the Iub interface where it requests the reduction of the bitrate for the PDUs delivered to its priority queue. In this fashion an existing congestion condition over the Uu interface can be mitigated or solved. As already mentioned, congestion conditions over the Iub and the Uu interfaces are dealt with differently according the present invention. This will be explained later in the text.

Finally, PDUs from the priority queue PQ1 are transmitted as data packets to one UE.

Figure 3:
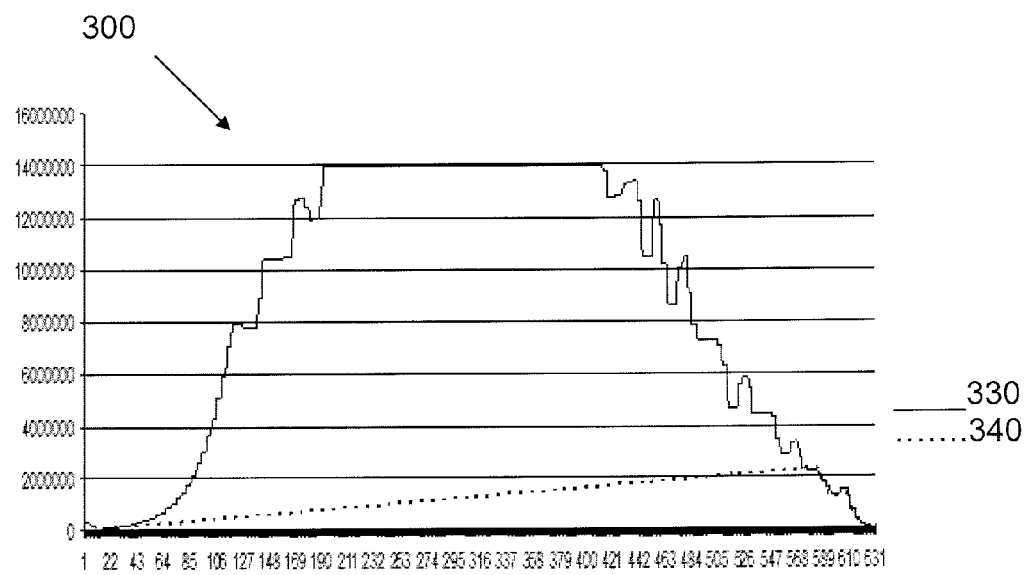
FIG. 3 depicts a diagram illustrating linear bandwidth increase and bandwidth increase by boosting according to known technology.

FIG. 3 illustrates a diagram 310 showing the CA bitrate as a function of time for rapidly changing CQI-reports in a known wireless communication system. The x-axis in the diagram 310 shows 100 ms intervals, while the y-axis represents the CA bitrate in bits per second.

The lined curve 330 represents so called boosting, that is, CA control frames containing requests for substantial bitrate increase for the PDUs delivered from the RNC. This situation may occur when the reported CQI suddenly increases.

The linear increase of the CA bitrate as shown by the dotted line 340 represents a situation where, for example, boosting the CA bitrate is not allowed, such as after an Iub congestion has occurred. In this case, the RBS requests the RNC via a CA control frame to gradually increase the bitrate.

Figure 4:
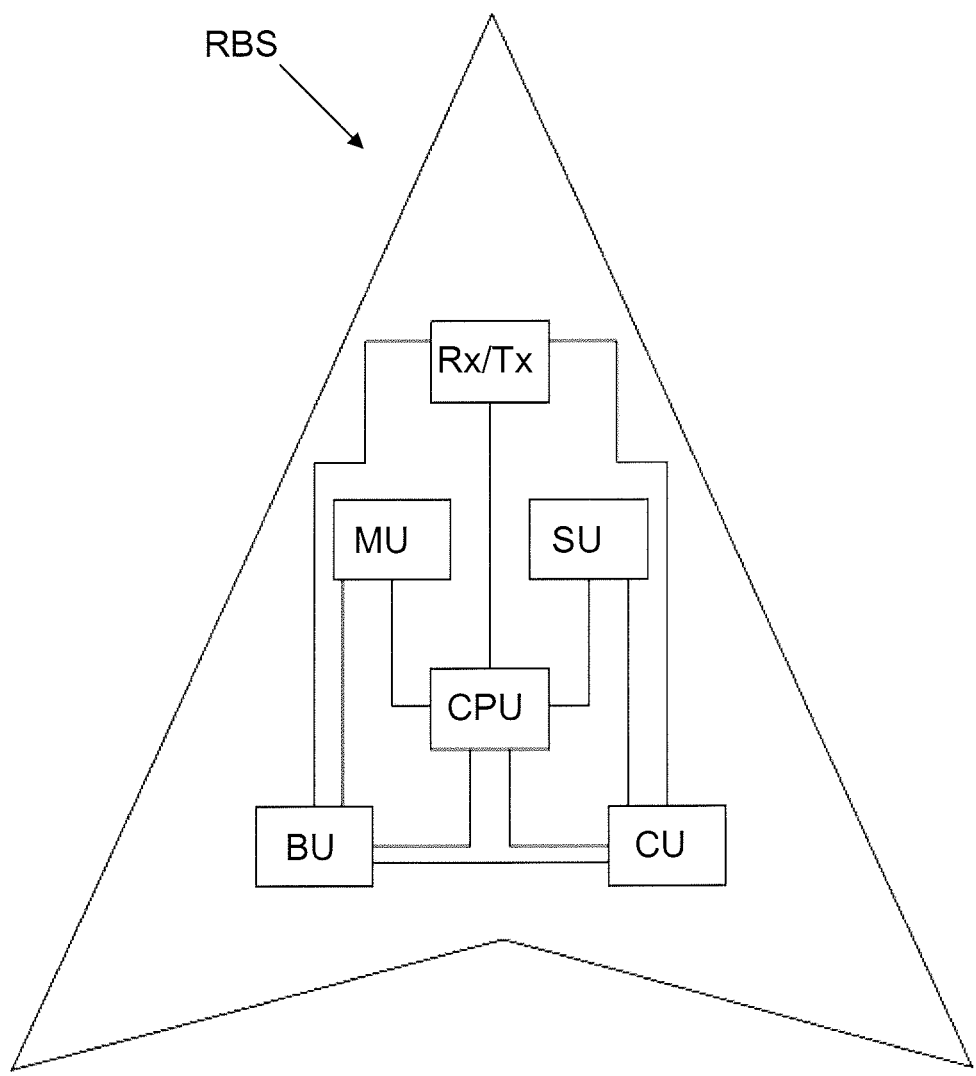
FIG. 4 illustrates a base station transceiver according to one embodiment of the present invention.

Before continuing with the description of the preferred embodiments of the present invention the terms bitrate boosting and gradual increase of the bitrate will be defined, Boosting is defined as a rapid increase of the bitrate from a predefined value up to a maximum bitrate value by a constant or a variable factor. A gradual bitrate increase is defined as an increase by a single constant rate B1 during a predetermined time interval, FIG. 4 depicts a schematical presentation of a RBS (Radio Base Station) according to one embodiment of the present invention. As pointed out earlier, the term RBS comprises any type of base transceiver station, such as for example a Node B or an access point which is communicating with a network controller over a suitable interface and with one or more mobile terminals in the coverage area of the base station.

The schematical RBS in FIG. 4 comprises a receiver/transmitter combination Rx/Tx, a measurement unit MU coupled to the receiver transmitter combination Rx/Tx and to a processing unit CPU. Moreover, the RBS comprises a scheduling unit SU connected to the processing unit as well as to a control unit CU. Also, the RBS is equipped with a buffer unit BU which, in turn, is connected to the receiver/transmitter combination Rx/Tx, the processing unit CPU and the control unit CU. It should be pointed out that the RBS presented according to the embodiment of the present invention in FIG. 4 is not limited to only operate in a UMTS- or a HSDPA-based network. In fact, the RBS according to the present invention may operate in any wireless communication network comprising an air interface and a wired interface, where the RBS is communication with a control node and where data is organized into data flows communicated via the control node to the RBS and finally to a mobile terminal.

Returning to FIG. 4, the RBS is adapted to transmit and receive PDUs belonging to one data flow over the air interface to and from a UE via the receiver/transmitter combination Rx/Tx. There may be several such data flows originating either in the core network to which the RBS is connected or even from another UE located in a packet data network communicating with the core network. More specifically, the receiver/transmitter combination Rx/Tx is adapted for transmitting PDUs stored in a buffer unit BU and belonging to one data flow when the PDUs are scheduled for transmission by the scheduling unit SU. Moreover, the receiver/transmitter combination communicates with a processing unit CPU which via CQI reports received from a UE may determine the maximum available bandwidth for data transmission via the Uu interface. Usually, this bandwidth is subject to variations due to interference, changes in the number of UEs in the coverage area served by the RBS, fading and other factors.

Besides being in communication with the receiver/transmitter combination Rx/Tx, the processing unit CPU also communicates with the scheduling unit SU. Its main task is to schedule incoming PDUs arriving from an RNC (Radio Network Controller) via the Iub interface into the buffer unit BU which for transmission as packet data over the air-interface. Here, the buffer unit BU may comprise one or more PQs (priority queues) such as the PQs shown in FIG. 2, even though these PQs are not explicitly shown in FIG. 4. The processing unit CPU is also adapted to detect congestion over the Iub and the Uu interface, that is, the interface to an RNC and the air interface.

The CPU may be adapted to detect Iub congestions in several different ways. Examples of Iub congestion detection may be receiving delay values from the measurement unit MU indicative of a delay for a frame transmitted from the RNC and received at the RBS or detecting destroyed or lost data frames. The latter can for example be done by the CPU by performing a CRC (Cyclic Redundancy Check) on the header of a received frame. In this fashion the CPU may detect a too long or too short data frame which may be an indication that the data frame is damaged because of too long buffer build-ups in the transport network. Also, the processing unit CPU may be adapted to detect missing sequence frame number in a series of received data frames. These ways of detecting congestion over the Iub interface are, per se, known to the skilled person.

The processing unit CPU may be adapted to react to detected Iub congestions by instructing the control unit CU to transmit CA control frames to the RNC requesting a bitrate reduction by a percentage of the bitrate at which the Iub congestion situation was detected. Normally, these CA control frames from the RBS to the RNC are transmitted at given tick times, such as every 100 ms. In this fashion, the bitrate over the Iub interface is reduced stepwise. At the same time, the processing unit CPU may also be adapted to prevent the RNC from boosting of the bitrate during a predefined amount of time. This the processing unit CPU may do by instructing the control unit CU to set a ProhibitBoostingTimer variable.

An example value during which the boosting is prohibited may be 10 seconds, but depending on implementation this value may be chosen so that the probability of a congestion condition over the Iub interface persisting is minimized.

However, if the scheduling unit SU detects a Uu congestion, the processing unit may transmit CA control frames requesting a decrease of the PDU bitrate from the RNC depending on the amount of data in the priority queue. Numerical amounts for the requested decrease of the PDU bitrate may differ from one wireless network to another. As mentioned above for the case when the processing unit CPU has detected a congestion over the Iub interface, the processing unit CPU may instruct the control unit CU to transmit CA control frames for bitrate reduction at the above mentioned tick times. In this fashion, the bitrate reductions and increases may be performed in a stepwise fashion.

The processing unit CPU may be adapted to continue requesting bitrate reductions from the RNC using CA control frames until the congestion condition over the Iub interface is not detected anymore. Theoretically, the CPU may thus instruct the control unit CU to request bitrate reduction until the actual bitrate between the RNC and the RBS over the Iub interface becomes zero.

Additionally, the processing unit CPU may be adapted to store the current granted bitrate for the PDUs received from the RNC in a variable in the buffer unit or in an internal memory register (not shown). This granted bitrate is the latest bitrate granted by the RBS to the RNC. We may call this variable reflecting the current granted bitrate caBitrate.

Moreover, the processing unit CPU according to the present invention may be adapted to discover congestion over the Uu interface by communicating with the measurement unit MU whose task it is to measure the fill state of the one or more priority queues PQs in the buffer unit BU. One way of measuring the fill state is by determining the time T a PDU remains in one priority queue before it is transmitted over the Uu interface. Such a time parameter T may be called the PQT (Priority Queue Time Length) parameter. The processing unit CPU may then through comparison with a predefined threshold value $T_{threshold}$ at predetermined intervals for the PQT determine whether PDUs in the priority queue stay too long. If the PDUs for example stay more than $T_{threshold}$ in the PQ in the buffer unit BU, the processing unit may interpret this as a Uu congestion condition and order the control unit CU to transmit CA control frames asking the RNC for a reduction of the bitrate for the incoming PDUs by a certain percentage of the current granted bitrate. Here, the amount of the requested bitrate reduction may depend on how long from the PQT threshold value $T_{threshold}$ the PDUs are staying in the PQ.

At the same time, the processing unit CPU may also be adapted to store the granted bitrate at which the Uu congestion condition was detected in a variable which we may call calubRefBitrate. The advantage of storing the granted bitrate value at which a Uu congestion was detected is that, the RBS may be able to boost the bitrate from the reduced level caused by the congestion back to the bitrate level stored in the calubRefBitrate. Thus, instead of a slow linear increase by a rate of increase B1 as was suggested by known technology, the bitrate may be boosted back to the stored calubRefBitrate using a rapid bitrate increase B2 leading to faster recovery from Uu congestion and better following of the rapidly varying transmission conditions over the Uu interface.

Hence, in the event of a Uu congestion, the processing unit CPU may be adapted for instructing the control unit CU to first transmit CA control frames requesting a decrease of the bitrate. After a certain time, the processing unit CPU may then instruct the control unit CU to transmit CA control frames requesting a bitrate boost up to the value stored in the calubRefBitrate parameter. Also, it may be added here that bitrate boosting up to the value stored in the calubRefBitrate parameter will only be allowed if it no congestion over the Uu and the Iub interface is detected. As long as a Uu or an Iub congestion condition persists, the processing unit CPU will continue instructing the control unit CU to transmit CA control frames requesting caBitrate reductions. The bitrate decrease and bitrate boost requested by the processing unit CPU via the CA control frames transmitted by the control unit CU may be performed at given tick times, as already mentioned earlier in the text. More specifically, the CPU may be adapted to determine whether there is a congestion condition either over the Iub or the Uu interface by for example checking the fill state of the priority queues and the condition of the PDUs received from the RNC at regular time intervals.

Since the present invention may apply to any wireless communication network comprising an RBS comprising packet buffers and communicating with one or more UEs over an air interface and with a network controller over another wired interface, numerical values for detection of congestion over the air interface may vary.

It may also be mentioned that the processing unit CPU may be adapted to deal with congestions over the Iub or the Uu interface on a per flow level. Thus each data flow from the RNC to each priority queue in the buffer unit BU may be controlled separately. This would make the RBS according to the present invention independent of the structure of the remaining network communicating with the one or more RNCs via an Iur interface, in case anchor RNCs (SRNCs) and drift RNCs (DRNCs) are used, where the anchor RNC is installed by a third party supplier.

Also, the processing unit CPU may according to the present invention be adapted to request a boost of the PDU bitrate from the RNC even if the boosting prohibit timer is active due to Iub congestion. In solutions suggested by known technology, this would not be possible. In the solution according to the present invention, the processing unit CPU may perform the PDU bitrate boost by measuring the granted PDU bitrate at which the Uu congestion occurred and store this value as a reference bitrate value in the calubBitrate parameter. Then, when an Iub congestion situation is detected, the processing unit CPU may request a decrease in the PDU bitrate from the RNC and thereafter a bitrate boost up to the level of the stored reference bitrate registered during the detection of the Uu congestion. Thus, the RBS according to the present invention may recover faster from an Iub congestion than was the case in previously suggested solutions by known technology.

Figure 5:
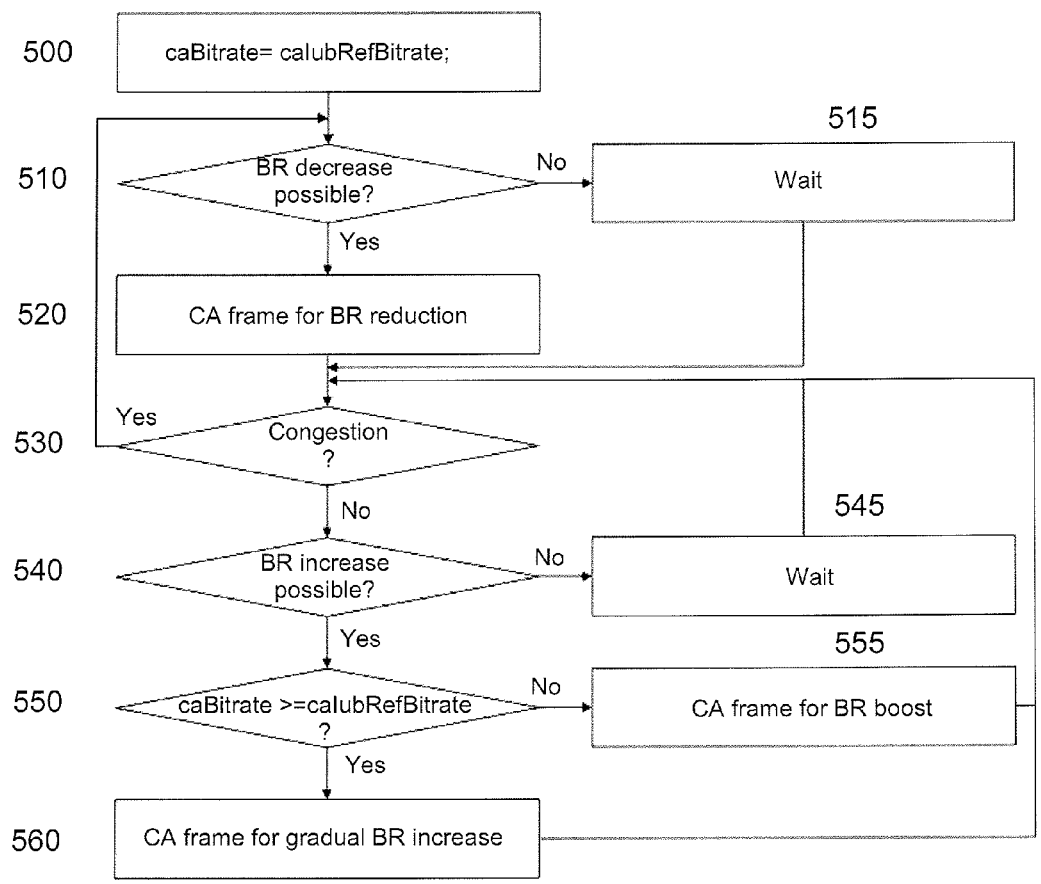
FIG. 5 illustrates the steps of a method according to the present invention.

Next, FIG. 5 illustrates the steps according to one example embodiment of the method of the present invention.

It is assumed that an RBS, such as the RBS from FIG. 4 has experienced an Iub congestion. In this case, the RBS will set a calubReferenceBitrate parameter to zero (thus setting the reference Iub bitrate between the RNC down to the RBS to zero) and prohibit boosting of the bitrate over the Iub interface (the caBitrate) by setting a ProhibitBoostingTimer variable to a predefined value indicative of the time period during which boosting of the caBitrate will be prohibited.

We assume now that a Uu congestion has occurred and that in the meantime the Iub congestion condition has terminated. Methods for detecting Uu congestions are sufficiently known to the skilled person and will not be elaborated here.

Thus, a Uu congestion is the starting point for the method steps according to one embodiment of the present invention which will be described below.

The method steps described below are also valid for the situation where the RBS only has experienced a congestion over the Uu interface, without a prior Iub congestion.

After the Uu congestion is detected, the processing unit of the RBS stores at step 500 the caBitrate that was operative at the time of the congestion as a reference bitrate. One way of doing this may be setting the calubRefBitrate parameter equal to the bitrate granted to the RNC by the RBS, that is, the caBitrate parameter when the Uu congestion was detected.

In the next step, at 510, the processing unit of the RBS checks whether a decrease of the caBitrate is possible or not. Normally, bitrate reductions may be performed at given time periods or tick times in order not to lower the bitrate over the Iub interface too quickly (not shown in the figure).

If a reduction of the caBitrate is possible, the processing unit may at step 520 instruct a control unit in the RBS, such as the control unit CU in FIG. 4 to transmit a CA control frame requesting a reduction of the caBitrate from the RNC towards the RBS. In one variant of the present invention, the amount of the caBitrate requested to be reduced may depend on the severity of the Uu congestion.

Otherwise, if at step 510 a caBitrate reduction is not possible, the processing unit may at step 515 simply wait for the next tick, which for example may occur every 100 ms and check at step 515 if the Uu congestion is still present. The reason for this is that it may happen that the Uu congestion condition terminates shortly after it has occurred, which would make an increase of the caBitrate possible and therefore an immediate reduction of the caBitrate unnecessary. One way of implementing this is by setting a timer in the processing unit prohibiting the decrease of the caBitrate during a certain predefined time. The state of the timer (active or deactivated, for example) may be checked during the above mentioned tick times. If the timer prohibiting the caBitrate decrease is deactivated and the Uu congestion condition has terminated in the meantime there is no need for a further reduction of the caBitrate, but instead it may be attempted to increase the caBitrate.

We assume here for simplicity that no Iub congestion has occurred in the meantime and that no Iub congestion has occurred during the execution of the remaining method steps 530-560 in FIG. 5. If, however, an Iub congestion occurs during any of the steps 530-560 after the Uu congestion, the processing unit may simply set the calubRefBitrate parameter to zero again and set the ProhibitBoostTimer in order to prevent boosting of the Iub bitrate (not shown). Detailed management of Iub congestion will not be described here, since it should be sufficiently known to the skilled person.

After the caBitrate has been reduced in step 520, the processing unit checks at step 530 whether the Uu congestion is still present. It should be mentioned here that checking whether a Uu congestion (and also Iub congestion for that matter) is present may be performed at the same tick times mentioned at step 515 earlier.

If the processing unit at step 530 has determined that the Uu congestion is till present, it returns to step 510 where it checks again whether a request for a caBitrate reduction is possible.

On the other hand, if the processing unit of the RBS has detected that the Uu congestion condition has terminated, it checks at step 540 whether an increase of the caBitrate is possible. The reason for this check is simply that requests for caBitrate increases in this embodiment of the method may be performed at certain tick times in order to give the RBS the opportunity to recover from the Uu congestion and to reduce the risk of causing a new Uu congestion by increasing the caBitrate too quickly. This may be implemented by setting specific timers in the processing unit prohibiting the caBitratre increase during a predefined amount of time.

If the caBitrate increase at step 540 is not possible, because the timer prohibiting the caBitrate increase is still active at that tick time, the processing unit simply waits at step 545 until the next tick and checks whether a new Uu congestion has occurred in the meantime.

In contrast, if the caBitrate increase is possible, the processing unit checks at step 550 whether the current caBitrate is greater than or equal to the previously stored calubRefBitrate when the Uu congestion occurred. If not, the processing unit of the RBS instructs the control unit to transmit a CA control frame to the RNC requesting a caBitrate boost by a boosting factor B2, where the boost may be exponential. The requests for boosting the caBitrate may continue until the reference caBitrate value stored in the calubReferenceBitrate is reached, provided no new Uu congestion occurs before that. In this fashion the caBitrate over the Iub interface can be increased faster than during a corresponding linear caBitrate bitrate increase used in solution suggested by known technology. One other advantage of the present invention is that the risk of the priority queue running empty may be decreased and that fluctuations of the maximum available bitrate over the Uu interface can be followed more quickly than was previously the case. Thereafter, the processing unit returns to step 530 to check if a new Uu congestion has occurred.

It should also be mentioned that the caBitrate boost may be requested by the processing unit even if the ProhibitBoostingTimer variable is set, provided the Iub congestion has terminated. Usually, solutions comprising known technology will only attempt boosting when the ProhibitBoostingTimer is inactive.

On the other hand, if the caBitrate is greater or equal to the calubRefBitrate at step 550, the processing unit of the RBS instructs the control unit to transmit a CA control frame requesting a gradual increase of the caBitrate by a factor B1 which may be chosen to be much smaller than the boosting factor B2, whereafter the method returns to step 530.

Figure 6:
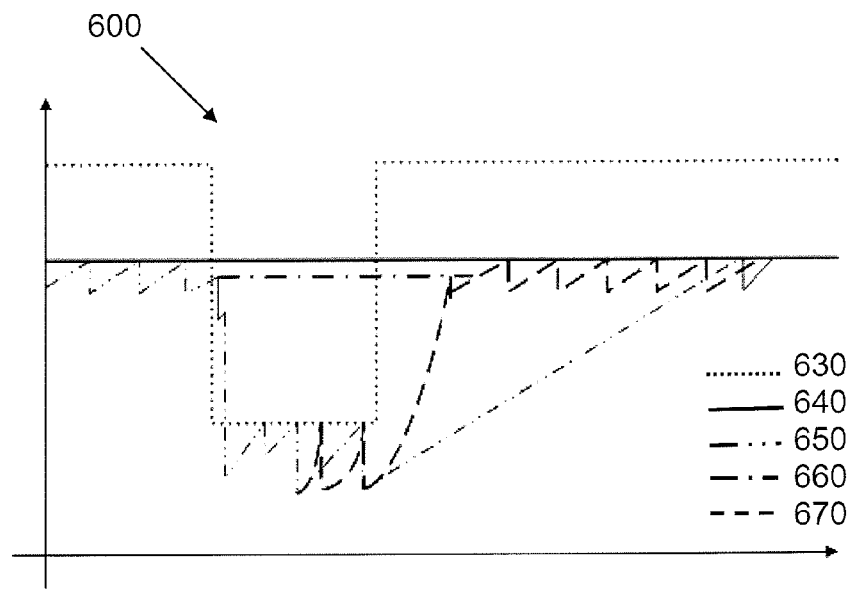
FIG. 6 illustrates a diagram illustrating the implementation of one embodiment of the method according to the present invention.

FIG. 6 shows a diagram 600 illustrating the method steps of FIG. 5.

In the diagram 600, the x-axis represents time in milliseconds, while the y-axis represents the capacity in bits/s.

The dotted line 630 represents the capacity over the radio link, i.e. the bitrate available between the base station and a mobile terminal, while the straight line 640 in the diagram 600 represents the Iub capacity, i.e., the bandwidth over the transport link between one or more network controllers or RNCs and one or more base stations, or RBSs.

Represented by a dashed and a double dotted line, the control of the Iub bitrate 650 according to known technology is lustrated. Firstly, the Iub bitrate lies close to the maximum lub bitrate until there is a drop due to, for example congestion. After a certain amount of time, the lub bitrate is made to increase linearly until it reaches the full lub capacity.

However, while the lub bitrate controlled according to the present invention marked by the dashed line 670 starts in the same fashion as the lub bitrate controlled according to known technology, it reaches the higher bitrate in a shorter amount of time due to the boosting of the bitrate up to the earlier mentioned reference lub bitrate 660 registered when a congestion over the air interface occurred. One can see the air interface congestion indicated by the square shaped dip in the air interface capacity represented by the dotted line 630.

The invention claimed is:

1. A method for congestion control in a wireless communication network comprising an air interface and a transport network interface, the method comprising:
   detecting a congestion condition over the air interface;
   storing a current bitrate over the transport network interface at which the congestion condition over the air interface was detected as a new reference bitrate;
   requesting a reduction of the bitrate over the transport network interface;
   requesting a boost of the bitrate over the transport network interface up to the stored new reference bitrate; and
   requesting a gradual increase of the bitrate over the transport network interface beyond the stored new reference bitrate.

2. The method according to claim 1, wherein after a new detection of a congestion condition over the air interface, a new current granted bitrate over the transport network interface is stored as a new reference bitrate and wherein a boost of the bitrate over the transport network interface up to the new stored reference bitrate is requested.

3. The method according to claim 1, comprising setting the reference bitrate to a predetermined minimum value when a congestion over the transport network interface is detected.

4. The method according to claim 1, comprising temporarily prohibiting requesting a boosting of the bitrate over the transport network interface up to the stored reference bitrate.

5. The method according to claim 1, wherein the requested bitrate reduction, boosting of the bitrate and the gradual bitrate increase are performed in incremental steps at predefined tick times.

6. The method according to claim 5, wherein the size of the incremental steps when requesting the bitrate reduction is dependent on the degree of severity of the detected air interface congestion condition.

7. The method according to claim 1, wherein the boosting of the bitrate comprises an exponential increase of the bitrate by a boosting factor and wherein the gradual increase of the bitrate comprises a linear increase of the bitrate over the transport network interface by a predefined factor.

8. The method according to claim 1, wherein the requested boosting of the bitrate or the gradual increase of the bitrate are performed when a given amount of time has elapsed since the last increase.

9. A base station for communication in a wireless communication network comprising:
   a receiver/transmitter combination configured to transmit and receive packet data;
   a buffer unit configured to store packet data before transmission;
   a measurement unit configured to determine a status of packet data stored in the buffer unit;
   a processing unit configured to compare the determined status with a predetermined status value; and
   a control unit configured to transmit requests for adjustments of a bitrate over a transport network interface;
   wherein the processing unit is configured to store a current bitrate value over a transport network interface as a new reference bitrate value when detecting a congestion condition over an air interface, the processing unit being further configured to instruct the control unit to send control information over the transport network interface indicative of a request for a boost of the bitrate over the transport network interface up to the stored new reference bitrate value.

10. A base station for communication in a wireless communication network comprising:
    a receiver/transmitter combination adapted to transmit and receive packet data;
    a buffer unit configured to store packet data before transmission;
    a measurement unit adapted to determine a status of packet data stored in the buffer unit;
    a processing unit configured to compare the determined status with a predetermined status value; and
    a control unit adapted configured to transmit requests for adjustments of a bitrate over a transport network interface;
    wherein the base station is further configured to store a current granted bitrate value over the transport network interface as a new reference bitrate value when detecting a congestion condition over an air interface and to instruct the control unit to send control information over the transport network interface indicative of a request for a boost of the bitrate over the transport network interface up to the stored new reference bitrate value.

11. A computer program product comprising a non-transitory, computer-readable medium having computer-readable instructions stored thereon, the computer readable instructions being executable by computerized device to cause the computerized device perform a method for congestion control in a wireless communication network comprising an air interface and a transport network interface, the method comprising:
    detecting a congestion condition over the air interface;
    storing a current bitrate over the transport network interface at which the congestion condition over the air interface was detected as a new reference bitrate;
    requesting a reduction of the bitrate over the transport network interface;
    requesting a boost of the bitrate over the transport network interface up to the stored new reference bitrate; and
    requesting a gradual increase of the bitrate over the transport network interface beyond the stored reference bitrate.

12. A processing unit for congestion control in a wireless communication network comprising an air interface and a transport network interface, the unit comprising:
    one or more data processors configured to detect a congestion condition over the air interface;
    a memory configured to store a bitrate over the transport network interface at which the congestion condition over the air interface was detected as a new reference bitrate;
    one or more data processors configured to:
       request a reduction of the bitrate over the transport network interface;
       request a boost of the bitrate over the transport network interface up to the stored new reference bitrate; and
       request a gradual increase of the bitrate over the transport network interface beyond the stored reference bitrate.

* * * * *

UNITED STATES PATENT AND TRADEMARK OFFICE
CERTIFICATE OF CORRECTION

PATENT NO.       : 8,693,329 B2                                            Page 1 of 2
APPLICATION NO.  : 13/000996
DATED            : April 8, 2014
INVENTOR(S)      : Blomstergren et al.

It is certified that error appears in the above-identified patent and that said Letters Patent is hereby corrected as shown below:

In the Specification

Column 3, lines 1-4, delete "One aspect...the steps." and insert same as a new paragraph at line 2.

Column 3, line 12, delete "bitrate and;" and insert therefor -- bitrate; and --.

Column 3, line 35, delete "interface" and insert therefor -- interface; --.

Column 3, lines 37 and 38, delete "value; where the" and insert therefor -- value. The --.

Column 3, line 40, delete "interface, the" and insert therefor -- interface. The --.

Column 3, line 41, delete "being" and insert therefor -- is --.

Column 3, line 55, delete "unit;" and insert therefor -- unit; and --.

Column 3, line 57, delete "interface; where the" and insert therefor -- interface. The --.

Column 4, line 11, delete "bitrate and;" and insert therefor -- bitrate; and --.

Column 4, line 19, delete "technology" and insert therefor -- technology. --.

Column 5, line 67, delete "defined" and insert therefor -- defined. --.

Column 6, line 5, delete "time interval," and insert therefor -- time interval. --.

Column 9, line 36-38, delete "In one variant...congestion." and insert same as a new paragraph at line 37.

Signed and Sealed this
Thirtieth Day of September, 2014

Michelle K. Lee
*Deputy Director of the United States Patent and Trademark Office*

Column 10, line 6, delete "till present," and insert therefor -- still present, --.

In the Claims

Column 12, line 20, in claim 10, after "control unit", delete the word "adapted".

Column 12, line 34, in claim 11, after "device", insert therefor -- to --.